United States Patent [19]

Takagi

[11] Patent Number: 5,404,065
[45] Date of Patent: Apr. 4, 1995

[54] ULTRASONIC ACTUATOR

[75] Inventor: Tadao Takagi, Yokohama, Japan

[73] Assignee: Nikon Corporation, Tokyo, Japan

[21] Appl. No.: 140,400

[22] Filed: Oct. 25, 1993

[30] Foreign Application Priority Data

Oct. 28, 1992 [JP] Japan .................. 4-289163

[51] Int. Cl.⁶ .......................................... H01L 41/08
[52] U.S. Cl. .................................................. 310/323
[58] Field of Search ..................... 310/321, 322, 323

[56] References Cited

U.S. PATENT DOCUMENTS

| | | | |
|---|---|---|---|
| 2,661,432 | 12/1953 | Mumper | 310/358 |
| 3,593,213 | 7/1971 | Franz et al. | 333/142 |
| 3,678,304 | 7/1972 | Humphryes et al. | 310/328 |
| 4,042,845 | 8/1977 | Hackett | 310/322 |
| 4,510,441 | 4/1985 | Hakamata et al. | 310/316 |
| 4,562,374 | 12/1985 | Sashida | 310/328 |
| 4,742,260 | 5/1988 | Shimizu et al. | 310/323 |
| 4,857,793 | 8/1989 | Okuno | 310/328 |
| 4,882,500 | 11/1989 | Iijima | 310/323 |
| 5,039,899 | 8/1991 | Yamaguchi | 310/323 |
| 5,140,215 | 8/1992 | Yamaguchi | 310/323 |
| 5,233,261 | 8/1993 | Wajid | 310/364 |
| 5,254,898 | 10/1993 | Terajima | 310/321 |
| 5,300,851 | 4/1994 | Nishikura et al. | 310/328 |

FOREIGN PATENT DOCUMENTS

| | | | |
|---|---|---|---|
| 0292008 | 11/1988 | European Pat. Off. | G11B 15/26 |
| 60-245482 | 12/1985 | Japan | H02N 2/00 |
| 61-251490 | 11/1986 | Japan | H02N 2/00 |
| 0117672 | 5/1989 | Japan | 310/322 |
| 2-023070 | 1/1990 | Japan | H02N 2/00 |
| 3-289372 | 12/1991 | Japan | H02N 2/00 |

*Primary Examiner*—Thomas M. Dougherty
*Attorney, Agent, or Firm*—Oliff & Berridge

[57] ABSTRACT

The ultrasonic actuator of the present invention includes a rod shaped vibration body having a plurality of faces, an exciter which is provided on a one of the faces for vibration excitation of the vibration body and which generates traveling waves which progress along this face for vibration excitation, and a movable member which is pressed against the vibration body and is moved by the traveling waves. The vibration body is so formed that the traveling waves which progress along the face for vibration excitation of the vibration body are transmitted to a face of the vibration body other than its face for vibration excitation, and are recirculated back to the face for vibration excitation again.

12 Claims, 12 Drawing Sheets

ULTRASONIC ACTUATOR

BACKGROUND OF THE INVENTION

1. Field of the Invention

The present invention relates to an ultrasonic actuator which circulates traveling waves around the surface of a vibration block and which moves a movable member by the action of these traveling waves.

2. Description of the Related Art

Figure 11:
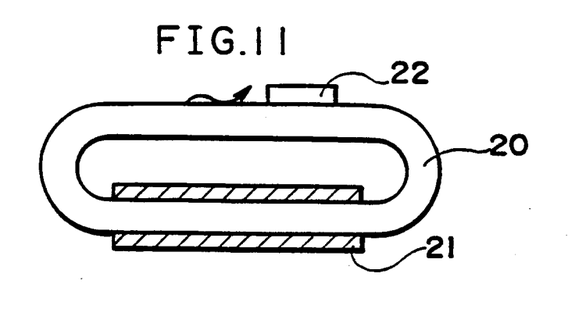
FIG. 11 is an elevation view showing one example of an ultrasonic actuator according to the prior art.
Figure 12A:
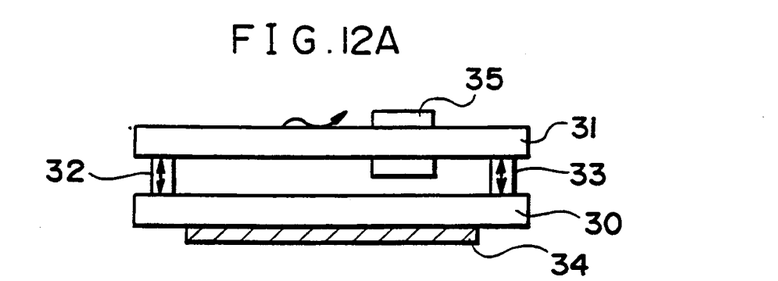
FIGS. 12A and 12B are elevation views showing another example of an ultrasonic actuator according to the prior art.
Figure 12B:
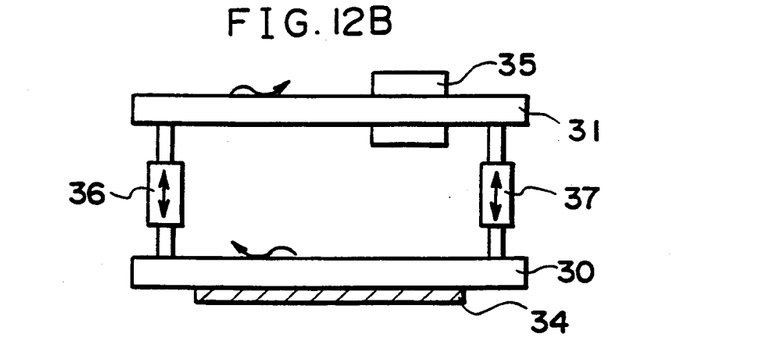
Figure 13:
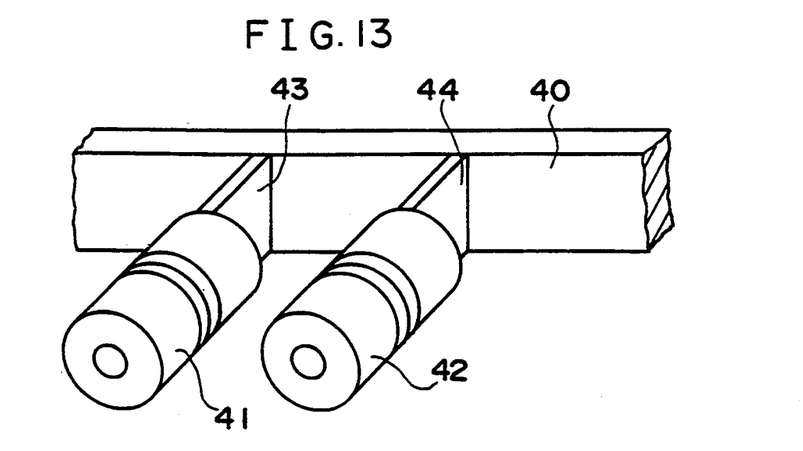
FIG. 13 is a perspective view showing yet another example of an ultrasonic actuator according to the prior art.

In the prior art, as such a type of ultrasonic actuator, there has for example been disclosed a type described in U.S. Pat. No. 4,562,374. FIGS. 11 through 13 are figures illustrating an example of a prior art type ultrasonic actuator.

The ultrasonic actuator shown in FIG. 11 is constructed so as to have a vibration block 20 which is rod shaped and is bent around and joined to itself so that both of its surfaces are endless. A piezoelectric element 21 is fixedly contacted to a first portion of the surface of this vibration block 20, and further a plate shaped movable member 22 is kept in pressure contact with another portion of the surface of this vibration block 20. When the piezoelectric element 21 is driven so that vibrations are excited in it, bending vibrations are set up in the vibration block 20, and traveling waves are generated by these transverse vibrations, by which the movable member 22 is driven. Since the vibration block 20 is formed so as to be endless, these traveling waves set up in the vibration block 20 are recirculated in a non-terminating cycle within the vibration block 20.

The ultrasonic actuator shown in FIG. 12A is constructed so as to have two vibration blocks 30 and 31, both of which are rod shaped and the ends of which are connected together by two couplers 32 and 33. A piezoelectric element 34 is fixedly contacted to the surface of the one 30 of these vibration blocks, and further a plate shaped movable member 35 is kept in pressure contact with the surface of the other one 31 of these vibration blocks. When the piezoelectric element 34 is driven so that vibrations are excited in it, bending vibrations are set up in the vibration block 30, and traveling waves are generated by these bending vibrations which are transmitted to the other vibration block 31 via the coupler 32, by which the movable member 35 is driven. The traveling waves transmitted through the vibration block 31 return round to the vibration block 30 via the other coupler 33, and in this manner the traveling waves are recirculated in a non-terminating cycle.

With the ultrasonic actuator shown in FIG. 12B, instead of the couplers 32 and 33, the vibration blocks 30 and 31 are linked together by oscillators 36 and 37.

With the ultrasonic actuator shown in FIG. 13, two vibrators 41 and 42 are linked by couplers 43 and 44 to the vibration block 40 which is formed in a rod shape. When the vibrators 41 and 42 are driven so that vibrations are excited in them, bending vibrations are set up in the vibration block 40 via the couplers 43 and 44, and traveling waves are generated by these bending vibrations which move a movable member not shown in the figures so as to drive it. The traveling waves transmitted through the vibration block 40 are converted into electrical signals by a vibrator which is connected to the vibration block 40 but which is not shown in the figures, and this electrical signal is returned to the vibrators 41 and 43. In this manner the traveling waves are effectively recirculated in a non terminating cycle.

However, with the ones of these prior art types of ultrasonic actuator in which the vibration propagation path of the vibration block is made to be endless in order to return the traveling waves from the portion of the vibration block which drives the movable member to the portion thereof which generates the traveling waves, the problem arises that the overall dimensions of the ultrasonic actuator become great because the vibration propagation path is required to be long. On the other hand, with the ones of these prior art types of ultrasonic actuator in which the traveling waves are recirculated electrically, the problem arises that the cost is increased due to the construction of the ultrasonic actuator becoming more complicated.

SUMMARY OF THE INVENTION

A primary objective of the present invention is to provide an ultrasonic actuator which is small in overall dimensions.

Another object of the present invention is to provide an ultrasonic actuator which has a simple construction.

Another object of the present invention is to provide an ultrasonic actuator which is low in cost.

In order to attain these objectives, the present invention proposes an ultrasonic actuator, comprising: a rod shaped vibration body having a plurality of faces; an exciter which is provided on a one of said faces for vibration excitation of said vibration body, and which generates traveling waves which progress along said face for vibration excitation; and a movable member which is pressed against said vibration body and is moved by said traveling waves; wherein said vibration body is so formed that the traveling waves which progress along said face for vibration excitation of said vibration body are transmitted to a face of said vibration body other than said face for vibration excitation thereof, and are recirculated back to said face for vibration excitation again.

By the construction of the rod shaped vibration body being such that the traveling waves which progress along the face for vibration excitation of the vibration body are transmitted to a face of the vibration body other than the face for vibration excitation thereof, and are recirculated back to the face for vibration excitation again, thereby it is possible to recirculate the traveling waves within the vibration body itself, without making any particular arrangements for any other elements to be included with the vibration body in any structure for endless recirculation. In this manner, it is possible to reduce the overall dimensions of the ultrasonic actuator. Further, no particular electrical or electronic arrangements are necessary to recirculate the traveling waves, so that the construction is kept simple and the cost is kept down.

DESCRIPTION OF THE PREFERRED EMBODIMENTS

First Embodiment

Figure 1:
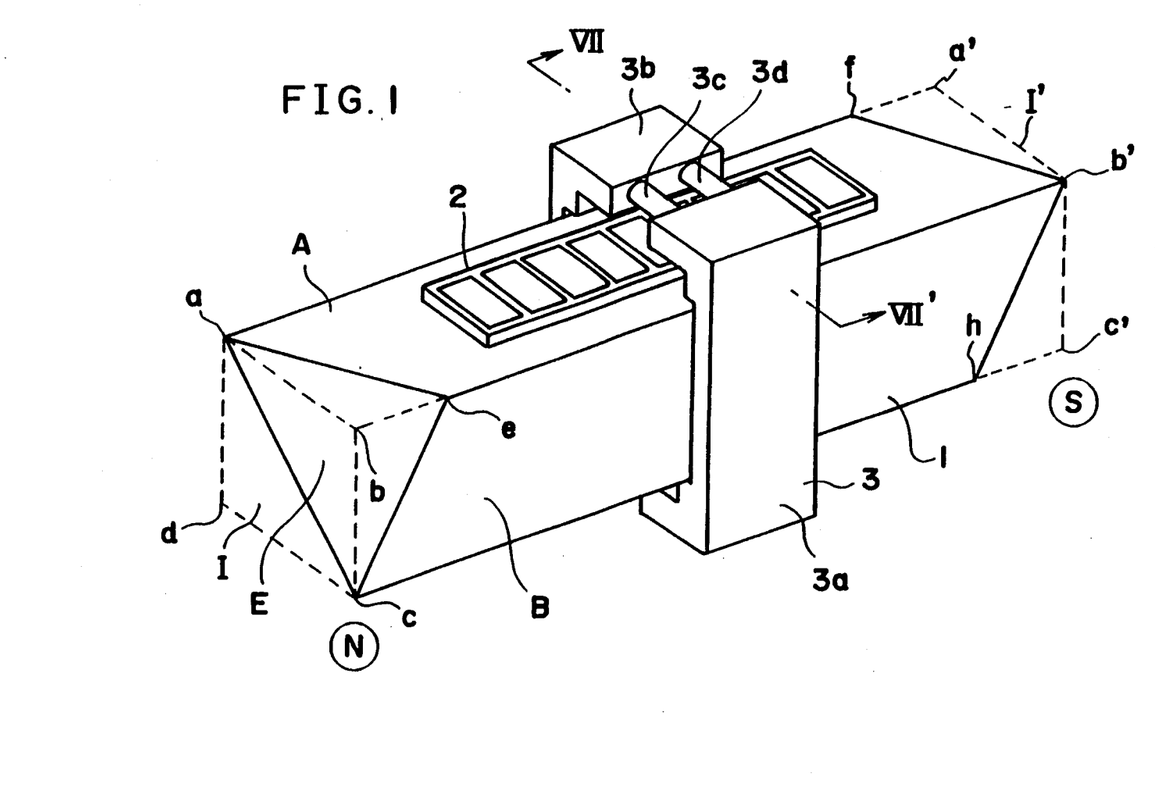
FIG. 1 is a perspective view showing an ultrasonic actuator which is a first embodiment of the present invention.
Figure 2A:
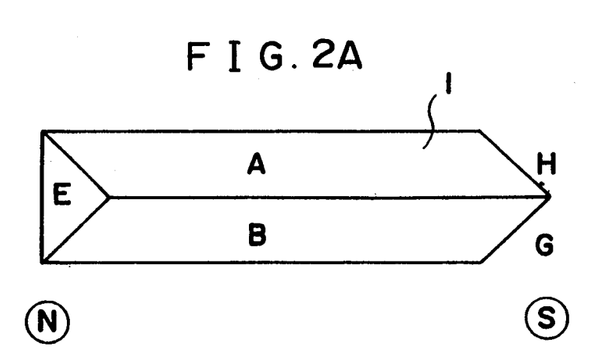
FIG. 2A is a frontal view showing a rod shaped vibration block which is incorporated in the first embodiment.
Figure 2B:
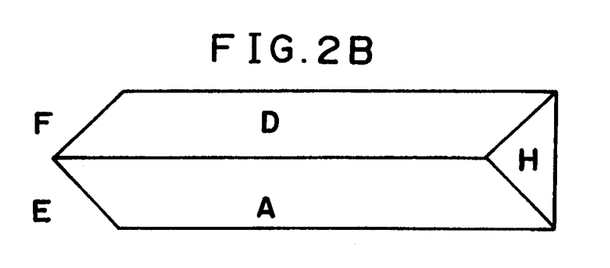
FIG. 2B is a plan view of the rod shaped vibration block of FIG. 2A.
Figure 2C:
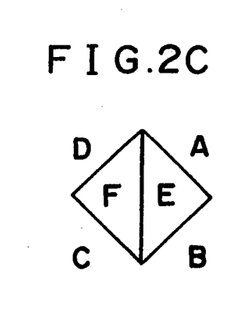
FIG. 2C is an end on view of the rod shaped vibration block of FIGS. 2A and 2B as seen from the left side of FIG. 2A.
Figure 2D:
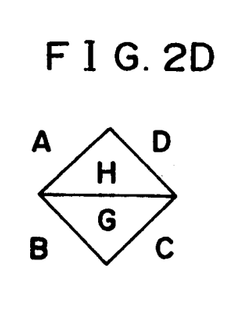
FIG. 2D is an end on view of the rod shaped vibration block of FIGS. 2A through 2C as seen from the right side of FIG. 2A.

FIG. 1 is a perspective view showing the first embodiment of the ultrasonic actuator of the present invention, while FIGS. 2A through 2D are figures showing a generally rod shaped vibration block, with FIG. 2A being a frontal view thereof, FIG. 2B being a plan view thereof, FIG. 2C being an end on view as seen from the left, and FIG. 2D being an end on view thereof as seen from the right.

Referring to FIGS. 1 and 2A–2D, the reference numeral 1 denotes a vibration block which is generally formed in a rod shape and is of square cross section along its central portion, and is formed from a substance which is capable of elastic vibration such as for example a metallic substance or the like. This vibration block 1 has four faces "A" through "D" which extend along its longitudinal direction. The face A and the face C are formed to mutually oppose one another, and these faces A and C constitute a first group of faces. Similarly, the face B and the face D are formed to mutually oppose one another, and these faces B and D constitute a second group of faces. Now, for convenience in explaining the manner and direction of progression of the traveling waves, in the following explanation one end in the longitudinal direction (the left end in FIG. 1) of the vibration block 1 will be termed the "N" end, while the other end (the right end in FIG. 1) will be termed the "S" end. (The terms "N" and "S" do not refer to magnetic polarity).

"E" and "F" faces in the forms of triangles are formed at the N end of the vibration block 1 as shown in FIG. 2C. In the same manner, "G" and "H" faces in the forms of triangles are formed at the S end of the vibration block 1 as shown in FIG. 2D. All of these faces E through H are formed as congruent isosceles triangles.

In concrete terms, considering the hypothetical cross section I of the vibration block 1 at its N end as shown in FIG. 1, and calling the vertices of this hypothetical cross section "a" through "d", two of the three vertices of the E face coincide with the vertices a and c respectively, and one of the edges of the E face is the diagonal line ac connecting these vertices a and c of this hypothetical cross section. Further, the other vertex of the E face is positioned on the edge connecting the A face and the B face. Accordingly, the triangles △abe and △cbe are congruent right angled isosceles triangles, and the triangle △ace (i.e. the face E) is an isosceles triangle. As for the F face, it has the line segment ac and the vertices a and c in common with the E face, and further has a vertex at a point (not shown in the figure) which lies on the edge which contacts the face C and the face D and which is the same distance from the vertex d as the length of the line segment be.

On the other hand, to consider the G face and the H face, they have as their common edge a diagonal line on the hypothetical cross section I' of the vibration block 1 at its S end (which corresponds to the diagonal line bd on the hypothetical cross section I ), and the other vertex h of the G face is positioned on the edge connecting the B face and the C face and is the same distance from the vertex c' as the length of the line segment be, while the other vertex f of the H face is positioned on the edge connecting the A face and the D face and is the same distance from the vertex a' as the length of the line segment be. By this construction, all of the faces E through H are congruent isosceles triangles, and the E face and the F face are respectively perpendicular to the G face and the H face.

The faces E through H constitute reflecting portions which are provided for reflecting the traveling waves which are traveling in the longitudinal direction of the vibration block 1, and the gist of the present invention is that, by the E face and the F face being disposed so as to be twisted round 90° with respect to the G face and the H face, the traveling waves are recirculated, without the provision of any recirculation path other than the generating portion for the traveling waves and the drive portion for the movable member.

Figure 6:
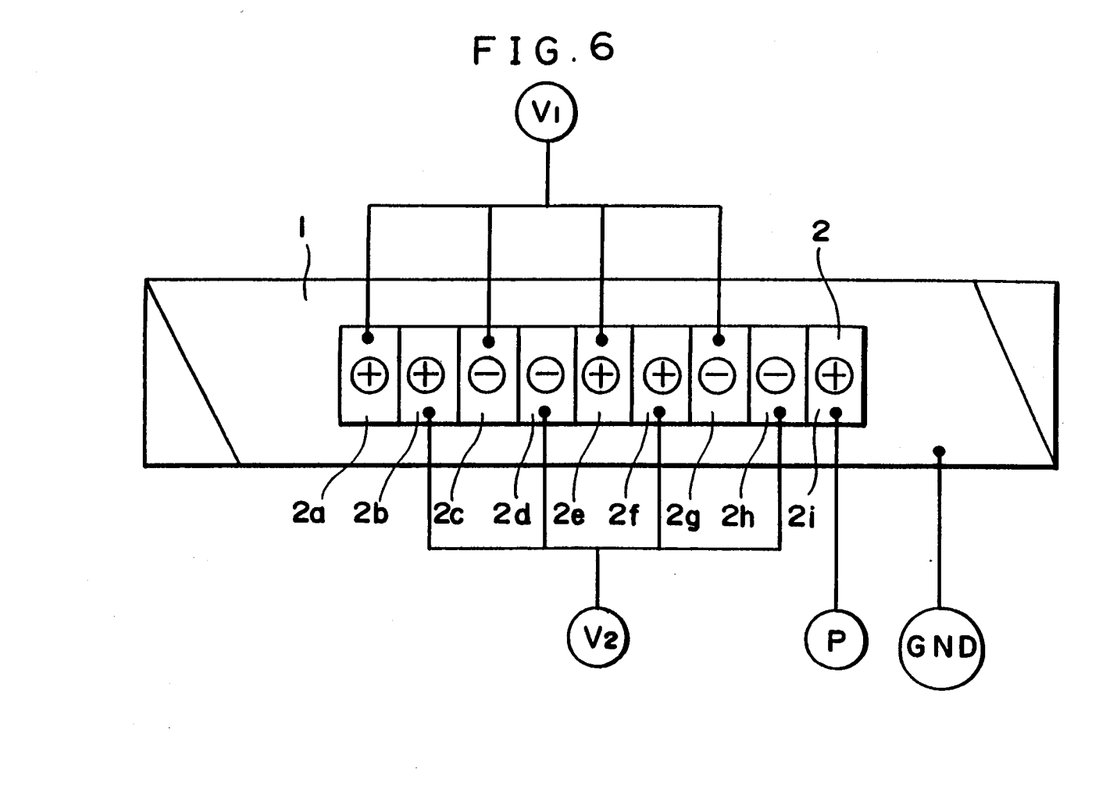
FIG. 6 is a simplified plan view showing the construction of an exciter of the first embodiment.

The reference numeral 2 denotes an exciter which is fitted on the A face, the details of which are shown in plan view in FIG. 6. This exciter 2 comprises eight driving plate shaped piezoelectric elements 2a through 2h and a piezoelectric element 2i for detecting vibration.

The eight driving piezoelectric elements 2a through 2h, as shown in FIG. 6, are arranged in pairs of the same polarity, with neighboring pairs alternately having opposite polarity. In FIG. 6, the sign "+" means that the polarity of an element is in the direction perpendicular to the plane of the drawing paper and away from the observer, while the sign "−" means that the polarity of an element is likewise in the direction perpendicular to the plane of the drawing paper but towards the observer.

An electrode, not particularly shown in the figures, is provided on the surface of each of the eight driving piezoelectric elements 2a through 2h. Further, a high frequency voltage V1 is applied to the surface electrodes of the driving piezoelectric elements 2a, 2c, 2e, and 2g taken in common as a set, while another high frequency voltage V2 is applied to the surface electrodes of the remaining ones of the driving piezoelectric elements 2b, 2d, 2f, and 2h taken in common as a set. The high frequency voltage V2 has the same frequency as the high frequency voltage V1 and has a time phase difference of $\pi/2$ with respect to the high frequency voltage V1. The rear surfaces of the eight driving piezoelectric elements 2a through 2h are fixed to the A face of the rod shaped vibration block 1 so as to be electrically contacted thereto. Accordingly, the rod shaped vibration block 1 constitutes a common ground electrode for all of the eight driving piezoelectric elements 2a through 2h.

The piezoelectric element 2i for detecting vibration converts the vibrations (the traveling waves) generated in the vibration block 1 into voltage. The phase difference of the amplitude of the voltage generated in the piezoelectric element 2i for detecting vibration is detected by a control means not shown in the figures, and this control means controls the voltages V1 and V2 applied to the eight driving piezoelectric elements 2a through 2h based upon the result of this voltage detection. Since the details of this type of control method are disclosed, for example, in Japanese laid-open Patent Application No. 61-251490 and U.S. Pat. No. 4,510,411, they will not be more particularly described in this specification, in the interests of brevity of disclosure.

Figure 7:
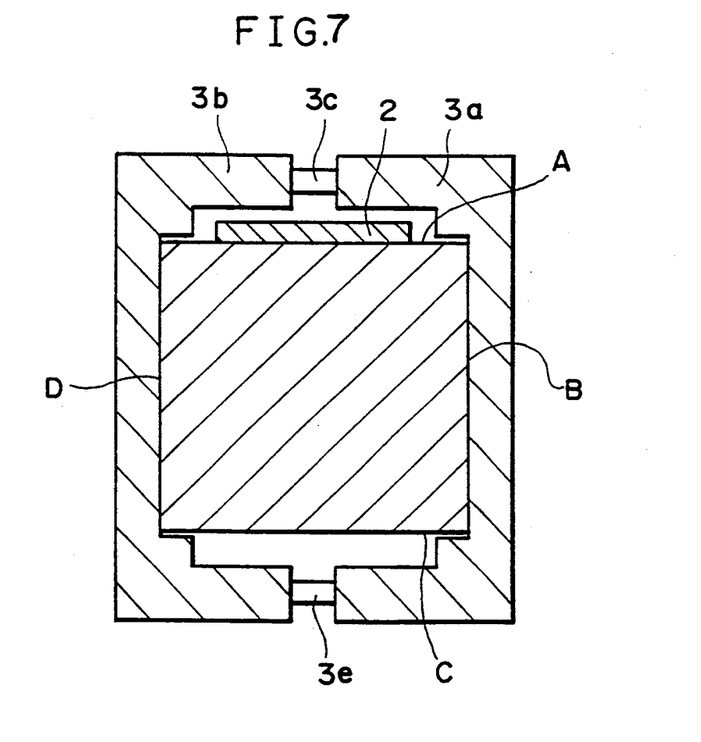
FIG. 7 is a sectional view of the ultrasonic actuator of FIG. 1 taken in a plane defined by the lines VII–VII' in that figure.

Returning to the description of FIG. 1, the reference numeral 3 denotes a movable member which is shown in detail in FIG. 7. The movable member 3 comprises pressure contact portions 3a and 3b which are respectively pressed against the B face and against the opposing D face of the rod shaped vibration block 1, and biasing elements 3c through 3f (of which 3e and 3f are not shown in FIG. 1 and 3d and 3f are not shown in FIG. 7) which are in tension and which therefore pull these pressure contact portions 3a and 3b towards one another and bias them together, thus pinching the rod shaped vibration block 1 between them.

In the following, the operation of the ultrasonic actuator of this first embodiment of the present invention will be described with reference to FIGS. 14A through 14D.

Figure 14A:
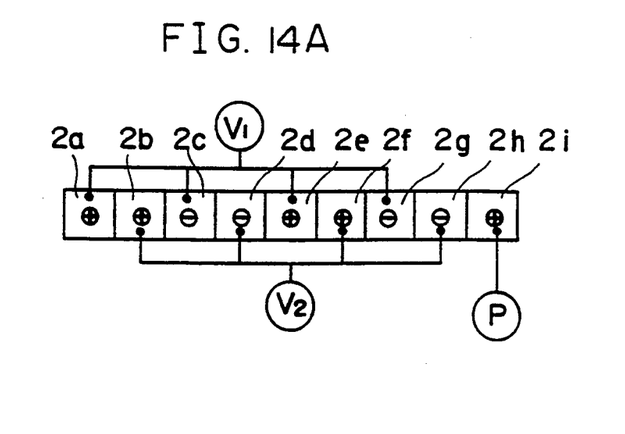
FIG. 14A is a simplified plan view, substantially identical to FIG. 6, and again showing the construction of the exciter of the first embodiment.
Figure 14B:
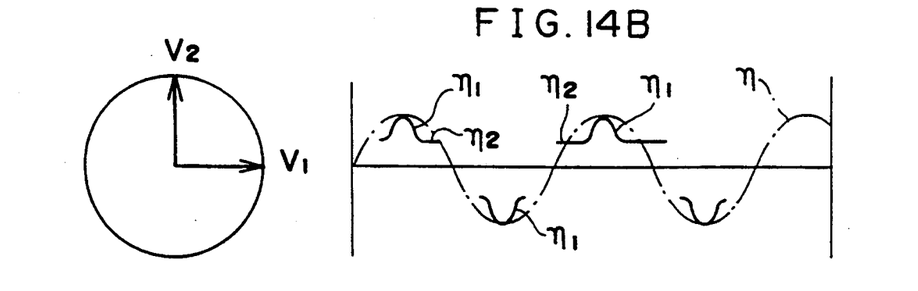
FIGS. 14B through 14D are waveform diagrams showing the progression of a waveform excited by the exciter.
Figure 14C:
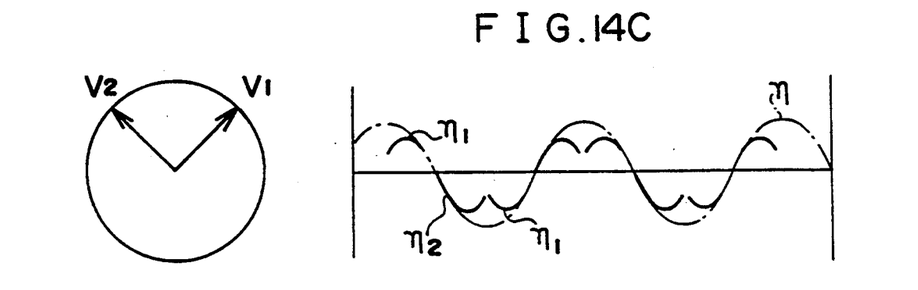
Figure 14D:
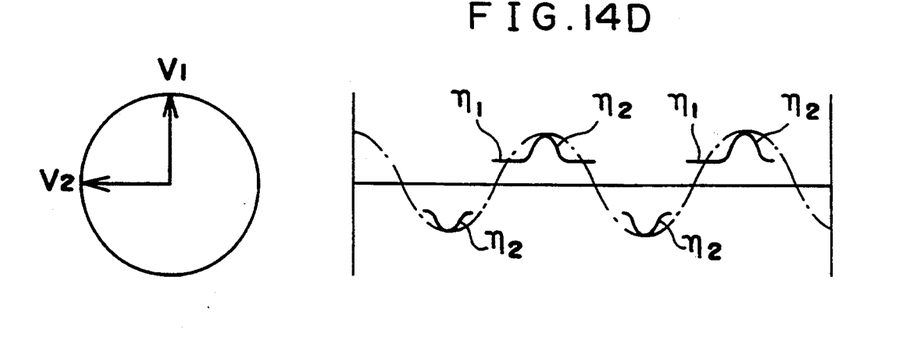

FIG. 14A is a figure substantially identical to FIG. 6, showing the construction of the exciter 2. The left portions of FIGS. 14B through 14D symbolically show (in vector form) the two sine wave voltage waveforms V1 and V2 which are being supplied to the piezoelectric elements 2a through 2h of the exciter 2, while the right portions of FIGS. 14B through 14D are corresponding waveform diagrams showing how the vibration block 1 bends at this time. The position along the horizontal axis in FIGS. 14B through 14D corresponds to the position in FIG. 14A along the exciter 2, i.e. to the various driving piezoelectric elements 2a through 2h. Further, in the left portions of FIGS. 14B through 14D, the projections onto the horizontal axis of the conceptual rotating voltage vectors V1 and V2 show the effective voltage values at various time points of these voltages, with positive electrical potential being shown by a projection which extends rightwards and negative electrical potential being shown by a projection which extends leftwards.

Referring to FIGS. 14B through 14D, in each of these figures the waveform portions $\eta 1$ show whether or not, and in which direction, by the supply of the sine wave voltage V1 to the driving piezoelectric elements 2a, 2c, 2e, and 2g, the portions of the vibration block 1 to which these piezoelectric elements are fixed are excited and are bent; and, similarly, the waveform portions $\eta 2$ show whether or not, and in which direction, by the supply of the sine wave voltage V2 to the other driving piezoelectric elements 2b, 2d, 2f, and 2h, the portions of the vibration block 1 to which these other piezoelectric elements are fixed are excited and are bent.

As shown in FIG. 14B, at the time point when the sine waves V1 and V2 at their phase positions as shown in vector form on the left side of the figure are applied to the driving piezoelectric elements 2a through 2h, the piezoelectric elements 2a, 2c, 2e, and 2g and the portions of the vibration block 1 to which these piezoelectric elements are fixed are bent as shown by the waveform portions $\eta 1$; while on the other hand the other piezoelectric elements 2b, 2d, 2f, and 2h and the other portions of the vibration block 1 to which these other piezoelectric elements are fixed, as shown by the waveform portions $\eta 2$, are not bent in either direction, but remain substantially undeformed in the plane state.

However, since the vibration block 1 is a continuous elastic body, at this time, viewed overall, it is not bent into a complicated wave shape by the combination of the waveform portions $\eta 1$ and the waveform portions $\eta 2$, but instead it is substantially bent into a combined wave shape which is close to a sine wave, as shown by the symbol $\eta$.

Further, as the sine wave voltages V1 and V2 change from their values as shown on the left side of FIG. 14B progressively over the passage of time via their values as shown on the left side of FIG. 14C to their values as shown on the left side of FIG. 14D while preserving their mutual phase difference of $\eta/2$, in tandem with this the bending state of the vibration block 1 also changes progressively from its condition as shown on the right side of FIG. 14B via its condition as shown on the right side of FIG. 14C to its condition as shown on the right side of FIG. 14D. Accordingly, a traveling wave is generated on the surface of the vibration block 1 as said surface is deformed from its overall wave shape $\eta$ as shown on the right side of Fig. 14B via its overall wave shape $\eta$ as shown on the right side of FIG. 14C to its overall wave shape $\eta$ as shown on the right side of FIG. 14D, and this traveling wave is transmitted along the vibration block 1 in its longitudinal direction in the leftwards direction in the figure. Now, since the details of the generation of this type of traveling wave are disclosed, for example, in Japanese Patent Laid-open Application 60-245482, they will not be more particularly described in this specification, in the interests of brevity of disclosure.

As for the types of the traveling waves which are generated, a surface wave is generated which is transmitted following along the surface of the vibration block 1, and also a bending wave is generated within the material of the vibration block 1 by the bending movement thereof. If the attenuation of the inner, deep portions of the vibration block 1 is small or the amplitude of the vibrations of the vibration block 1 by excitement of the exciter 2 is large, the bending wave becomes dominant. On the other hand, if the attenuation of the deep portions of the vibration block 1 is great or the amplitude of the vibrations of the vibration block 1 is small, the surface wave becomes dominant.

Next, referring to FIG. 3, the manner in which the bending waves traveling through the rod shaped vibration block 1 are recirculated within the vibration block 1 will be explained.

Figure 3:
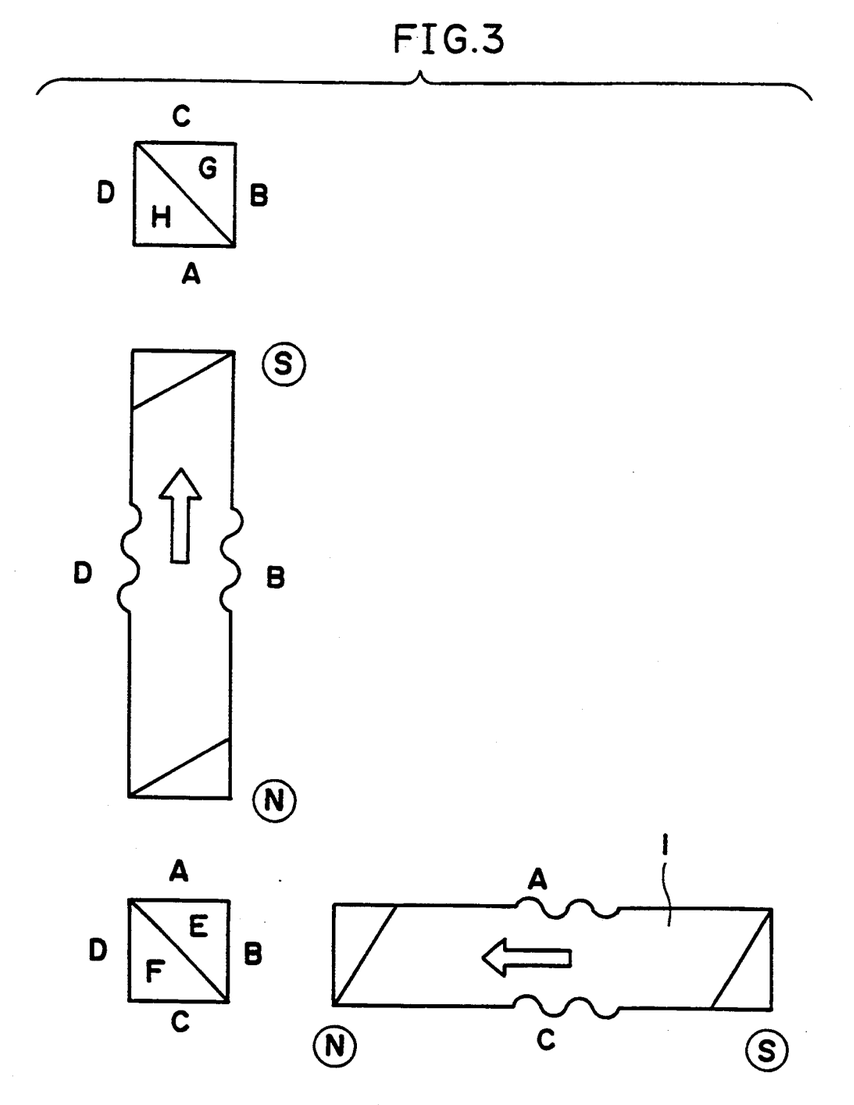
FIG. 3 is a schematic set of figures for explanation of the manner in which the bending waves traveling through the rod shaped vibration block of FIGS. 1 and 2A through 2D are recirculated in a non terminating cycle within the vibration block.

The bending wave in the vibration block 1 which is generated by the application of the high frequency voltages V1 and V2 to the exciter 2 provided on the A face of said vibration block 1 travels from the S end of the vibration block 1 towards its N end while vibrating the vibration block 1 in the direction perpendicular to its A face and to its C face, as shown at the lower right portion of FIG. 3. This bending wave is reflected from the E face and from the F face which are at this N end of the vibration block 1 and is rotated by (b 90° around its direction of propagation (its polarization is rotated), and then travels back towards the S end of the vibration block 1 while now vibrating the vibration block 1 in the direction perpendicular to its B face and to its D face, as shown at the left central portion of FIG. 3. And when this returning bending wave reaches the S end of the vibration block 1 it is similarly reflected from the G face and from the H face which are at this S end of the vibration block 1 and is again rotated by 90° around its direction of propagation (its polarization is again rotated), and travels back towards the N end of the vibration block 1 as before while again vibrating the vibration block 1 perpendicular to its A face and to its C face. In this manner, the bending wave is recirculated within the vibration block 1.

Moreover, since in this first embodiment the cross section of the vibration block 1 is square in shape, any neighboring two of the longitudinal faces of said vibration block 1 (for example the face A and the face B) are perpendicular. Accordingly, a bending wave which is vibrating in the direction perpendicular to the A face and to the C face (which are parallel), and a bending wave which is vibrating in the direction perpendicular to the B face and to the D face (which are also parallel), do not interfere with one another, even if for example their phases coincide, because their directions of vibration are mutually perpendicular and therefore they are mutually perpendicularly polarized.

Next, referring to FIG. 4, the manner in which the surface waves traveling along the surface of the rod shaped vibration block 1 are recirculated within the vibration block 1 will be explained.

Figure 4:
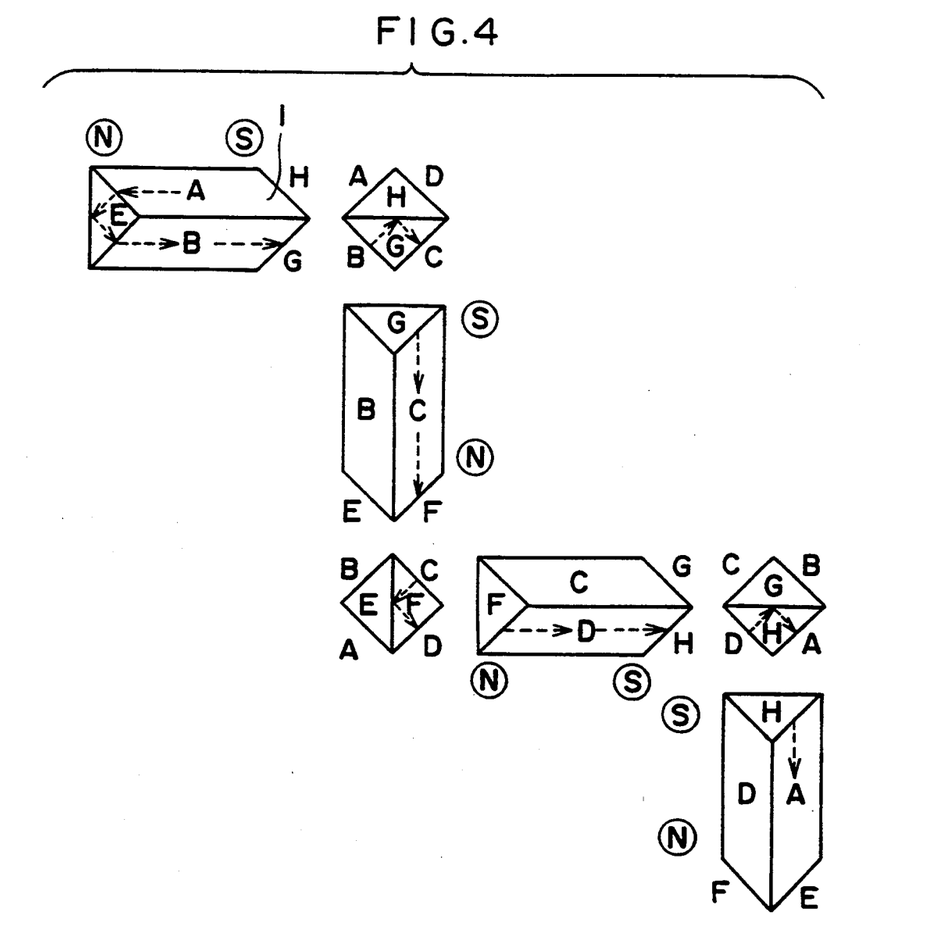
FIG. 4 is a schematic set of figures for explanation of the manner in which the surface waves traveling along the rod shaped vibration block of FIGS. 1 through 3 are recirculated in a non terminating cycle on the surface portions of the vibration block.

The surface wave in the vibration block 1 which is generated by the application of the high frequency voltages V1 and V2 to the exciter 2 provided on the A face of said vibration block 1 travels along the A face in the direction from the S end of the vibration block 1 towards its N end while vibrating the vibration block 1 in the direction perpendicular to said A face, as shown at the first upper left figure of FIG. 4. When this surface wave reaches the E face at the N end of the vibration block 1, it crosses the edge between the A face and the E face, traverses the E face, is reflected from the edge between the E face and the F face, traverses the E face again, crosses the edge between the E face and the B face, and then travels back towards the S end of the vibration block 1 along its B face while now vibrating the vibration block 1 in the direction perpendicular to said B face. And when this returning surface wave reaches the S end of the vibration block 1, as shown in the second figure of FIG. 4, it similarly crosses the edge between the B face and the G face, traverses the G face, is reflected from the edge between the G face and the H face, traverses the G face again, crosses the edge between the G face and the C face, and then travels back towards the N end of the vibration block 1 along its C face while now vibrating the vibration block 1 in the direction perpendicular to said C face, as shown in the third figure of FIG. 4. And next, when this surface wave reaches the F face at the N end of the vibration block 1, as shown in the fourth figure of FIG. 4, it crosses the edge between the C face and the F face, traverses the F face, is reflected from the edge between the F face and the E face, traverses the F face again, crosses the edge between the F face and the D face, and then as shown in the fifth figure of FIG. 4 travels back towards the S end of the vibration block 1 along its D face while now vibrating the vibration block 1 in the direction perpendicular to said D face. Finally, when this returning surface wave reaches the S end of the vibration block 1, as shown in the sixth figure of FIG. 4, it crosses the edge between the D face and the H face, traverses the H face, is reflected from the edge between the H face and the G face, traverses the H face again, crosses the edge between the H face and the A face, and then travels back towards the N end of the vibration block 1 along its A face while now vibrating the vibration block I in the direction perpendicular to said A face, as shown in the seventh figure of FIG. 4. In this manner, the surface wave completes a cycle, and is recirculated within the vibration block 1.

Figure 5:
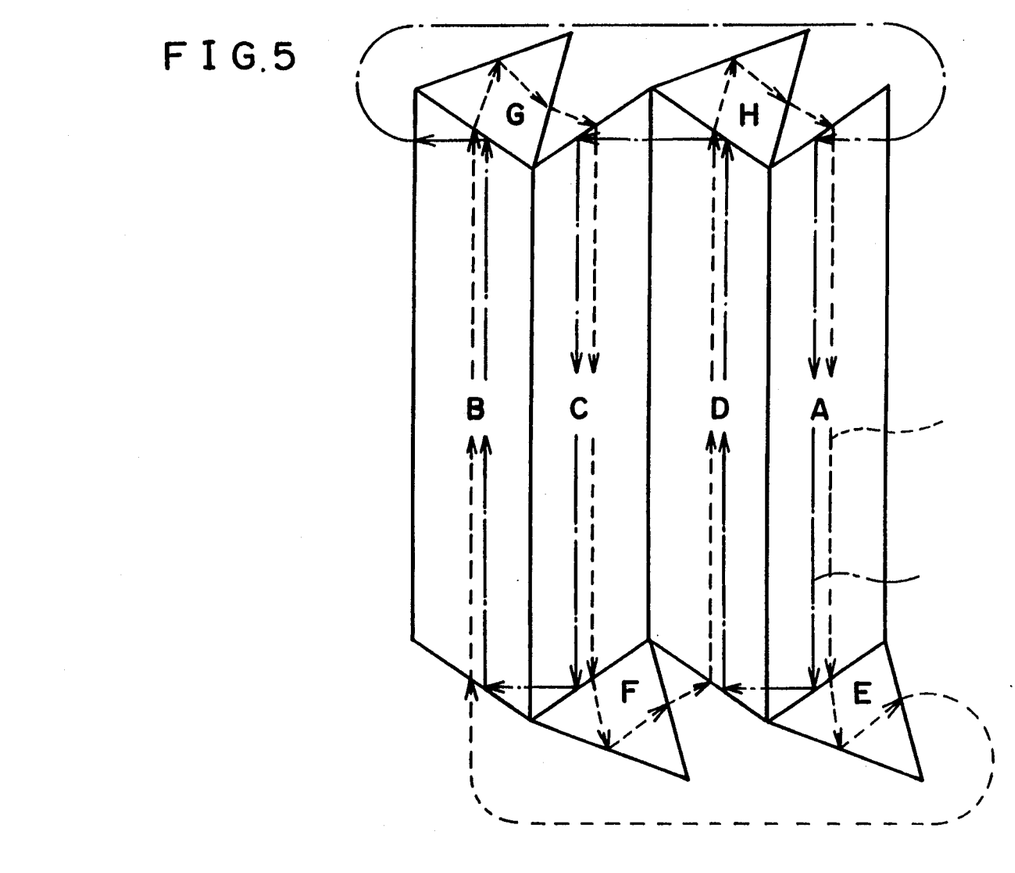
FIG. 5 is a schematic figure showing the surface of the rod shaped vibration block of FIGS. 1 through 4 as unfolded, with the path of a surface wave traveling along said vibration block being shown by an endless dotted line and the path of a transverse wave traveling through said vibration block being shown by an endless solid line.

FIG. 5 is a schematic figure showing the surface of the rod shaped vibration block 1 as unfolded. In this figure, the path of a surface wave traveling along said vibration block (as explained above) is shown by an endless dotted line and the path of a bending wave traveling through said vibration block (as also explained above) is shown by an endless solid line. The important point to be understood from this FIG. 5 is that both the surface wave and the transverse wave proceed in the same direction as one another along each of the faces A through D which extend in the longitudinal direction of the vibration block 1, although the details of the manner in which these two waves are reflected from the N and the S ends of the vibration block 1 are different. In this way, it is ensured that the surface wave and the bending wave never destructively interfere with one another on any of the longitudinal faces A through D. Further, since the movable member 3 is kept in pressing contact with the B face and with the D face (in this first embodiment), and since the direction of the surface wave and the bending wave on the B face and the direction of the surface wave and the bending wave on the D face are the same (towards the S end of the vibration block 1), thereby the surface wave and the bending wave both serve for impelling the movable member 3 in the same direction on both of the faces of the vibration block 1 in contact with which said movable member 3 is kept.

By the above construction, the bending waves and the surface waves generated in the A face of the vibration block 1 by the exciting vibrations of the exciter 2 progress within the vibration block 1 along the A face and are then transmitted, in sequence, back along the D face or the B face respectively, forward again along the C face, and back again along the B face or the D face respectively, to return to progress again along the A face so as to be recirculated in endless paths. And, when progressing along the B face and also when progressing along the D face, both these types of wave drive the movable member 3 in the longitudinal direction of the vibration block 1 towards its S end.

Second Embodiment

Figure 8:
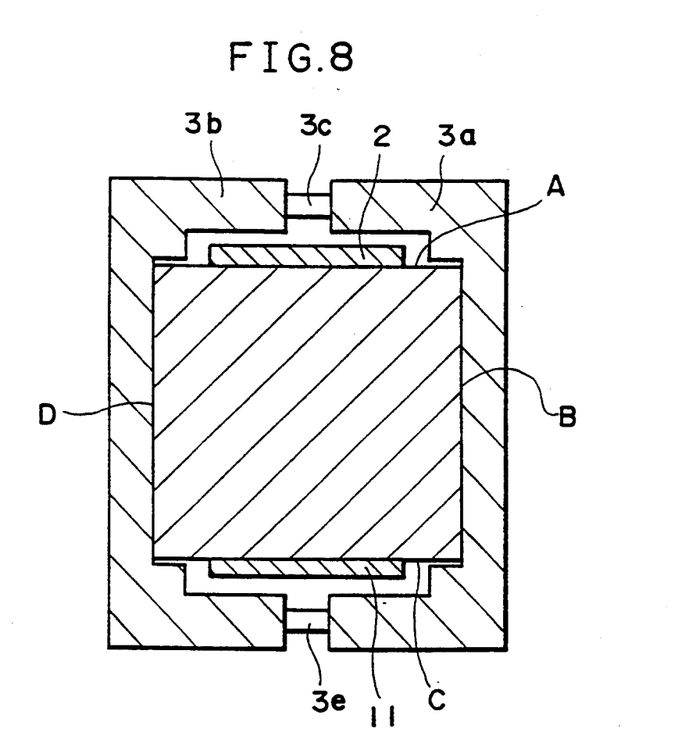
FIG. 8 is a sectional view showing an ultrasonic actuator which is a second embodiment of the present invention, taken in a sectional plane similar to that of FIG. 7.

FIG. 8 shows a sectional view of an ultrasonic actuator which is a second embodiment of the present invention, taken in a sectional plane similar to that of FIG. 7 for the first embodiment described above. In the following explanation and in the following figures, parts which correspond to parts of the first embodiment described above and which have the same functions are denoted by the same reference numerals, and their description will be abbreviated.

The point in which this second embodiment differs from the first embodiment is that in this case a pair of exciters is provided, said exciters being denoted by the reference numerals 2 and 11, instead of the single exciter 2 of the first embodiment. The first exciter 2 is provided, as before, on the A face of the vibration block 1, while the second exciter 11 is now provided on the C face of the vibration block 1. The exciters 2 and 11 are required to be operated in proper synchrony by means which are per se known in the relevant art. This construction is effective for driving the movable member 3 with a high force.

Third Embodiment

Figure 9:
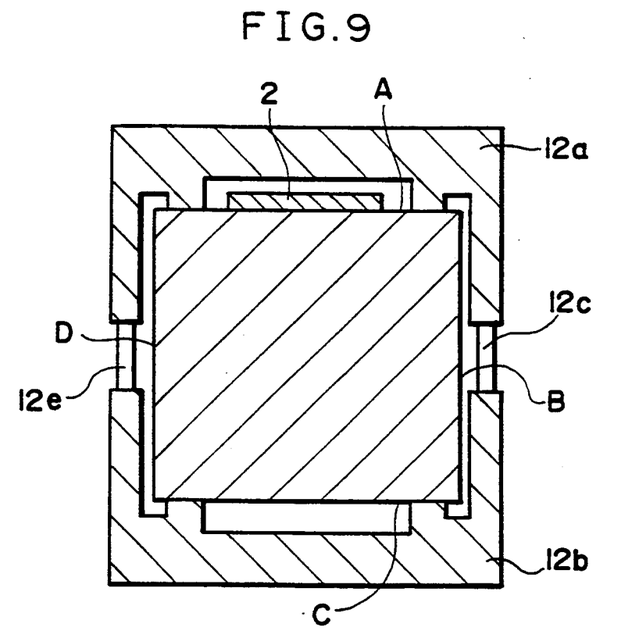
FIG. 9 is a sectional view showing an ultrasonic actuator which is a third embodiment of the present invention, taken in a sectional plane similar to those of FIGS. 7 and 8.

FIG. 9 shows a sectional view of an ultrasonic actuator which is a third embodiment of the present invention, taken in a sectional plane similar to that of FIGS. 7 and 8 for the first and second embodiments described above.

The point in which this third embodiment differs from the first and second embodiments is that in this case the movable member 12 is so provided as to be kept pressed in sliding contact with the same face of the vibration block 1 —the face A—on which the exciter 2 is provided, as well as being kept pressed in sliding contact with the opposite face—the face C. The merit of this modification is that, in the manufacturing process for the vibration block 1, the face or faces on which the exciter 2 is to be provided are required to be machined with relatively high accuracy so as to be accurately planar, and similarly the face or faces on which the movable member is to be pressed and kept in sliding contact are required to be machined with relatively high accuracy so as to be accurately planar; and, since in this third embodiment these faces are the same (the face A and the face C), the time required for the manufacturing process is shortened and accordingly the cost is reduced. The movable member 12 of this third embodiment, like the movable member 3 of the first embodiment, comprises a pair of pressure contact portions 12a and 12b which are now respectively pressed against the A face and against the opposing C face of the rod shaped vibration block 1, and biasing elements 12c through 12f (of which 12d and 12f are not shown in the figure) which are in tension and which therefore pull these pressure contact portions 12a and 12b towards one another and bias them together, thus pinching the rod shaped vibration block 1 between them.

Fourth Embodiment

Figure 10:
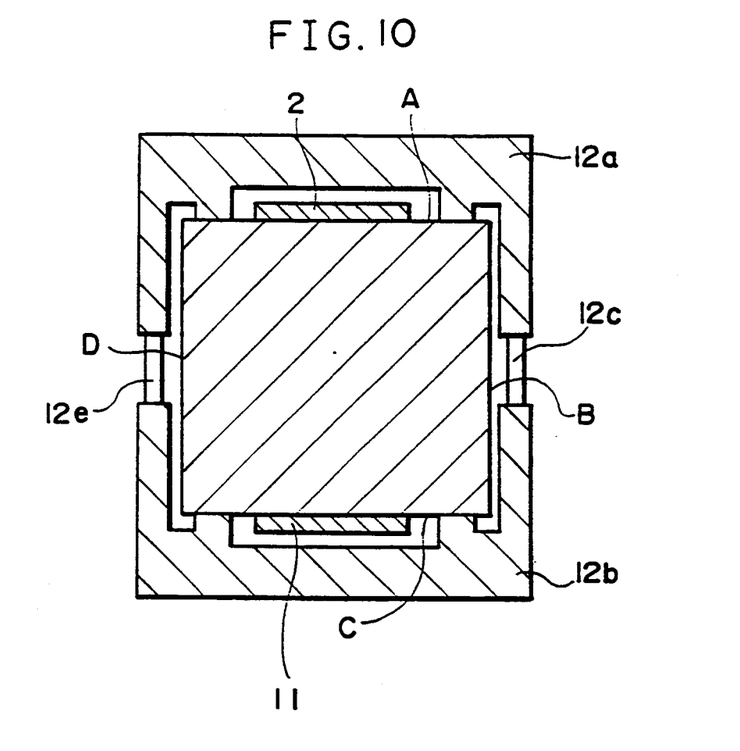
FIG. 10 is a sectional view showing an ultrasonic actuator which is a fourth embodiment of the present invention, taken in a sectional plane similar to those of FIGS. 7 through 9.

FIG. 10 shows a sectional view of an ultrasonic actuator which is a fourth embodiment of the present invention, taken in a sectional plane similar to that of FIGS. 7 through 9 for the first through the third embodiments described above. In the following explanation and in this figure, parts which correspond to parts of the second and the third embodiment described above and which have the same functions are denoted by the same reference numerals, and their description will be abbreviated.

The distinguishing feature of this fourth embodiment is that it combines the distinguishing features of the second and the third embodiments: a pair of exciters 2 and 11 is provided, and also the movable member 12 is so provided as to be kept pressed in sliding contact with the same face of the vibration block 1—the face A—on which the first exciter 2 is provided, as well as being kept pressed in sliding contact with the opposite face—the face C—on which the second exciter 11 is provided. The advantages of the second and the third embodiments are combined in this fourth embodiment: the movable member 3 is driven with a high force, and moreover, since only the faces A and C are required to be machined with a high accuracy so as to be accurately planar, the time required for the manufacturing process is shortened and accordingly the cost is reduced.

The ultrasonic actuator of the present invention has been shown and described in terms of several embodiments thereof, but is not to be considered as being limited by any of the perhaps quite fortuitous details of said embodiments or of the drawings, since other variations are possible. As one example, although in the embodiments disclosed above an exciter was provided on at least one of the A face and the opposing C face, this is not to be considered as limitative of the present invention: it would be possible, as an alternative, for exciters to be provided on two neighboring faces, such as for example on the A face and on the B face, or on the C face and on the D face. Other variations are also possible. Accordingly the present invention is to be considered as being defined only by the terms of the appended claims, which follow.

I claim:

1. A traveling wave type ultrasonic actuator, comprising:
    a rod shaped vibration body having a plurality of faces and first and second reflecting portions;
    a signal generator for generating an excitation
    an exciter, connected to said signal generator, which is provided on one of said faces of said vibration body and which generates traveling waves in said vibration body in response to said excitation signal which progress along said one face; and
    a movable member in contact with said vibration body and which is moved by said traveling waves;
    wherein said vibration body is formed so that the traveling waves which progress along said one face for vibration excitation of said vibration body are reflected by said first reflecting portion and are transmitted to a face of said vibration body other than said one face for vibration excitation thereof, and are recirculated back to said one face by said second reflecting portion for vibration excitation again of said one face.

2. An ultrasonic actuator according to claim 1, wherein said exciter comprises a plurality of piezoelectric elements arranged in a series along the longitudinal direction of said vibration body.

3. An ultrasonic actuator according to claim 1, wherein the cross sectional shape of said vibration body is formed as a rectangle.

4. An ultrasonic actuator according to claim 1, wherein said movable member further comprises first and second contact portions and first and second biasing portions wherein said first and second biasing portions connect said first contact portion to said second contact portion and provide a biasing force pulling said first and second contact portions together.

5. The ultrasonic actuator of claim 4, wherein said biasing force also presses said first and second contact portions against the faces of said vibration body.

6. A traveling wave type ultrasonic actuator, comprising:
a vibration body which is rod shaped and which has a first group of faces which consists of two opposing faces and a second group of faces which consists of two opposing faces which differ from said first group of faces, both said first group of faces and said second group of faces being extended along a longitudinal direction of said vibration body;
a signal generator for generating an excitation signal;
an exciter, connected to said signal generator, which is provided on at least one face of said first group of faces of said vibration body, and that generates traveling waves in response to said excitation signal which progress in said longitudinal direction of said vibration body; and
a movable member in contact with said vibration body and which is moved by said traveling waves;
a first reflecting portion formed at a first end of said vibration body which reflects said traveling waves progressing in said longitudinal direction from said first group of faces and transmits said traveling waves to said second group of faces;
and, a second reflecting portion formed at a second end of said vibration body which reflects said traveling waves progressing in said longitudinal direction from said second group of faces to said first group of faces.

7. An ultrasonic actuator according to claim 6, wherein a pressing member presses said movable member against at least one of said second group of faces.

8. An ultrasonic actuator according to claim 6, wherein a pressing member presses said movable member against at least one of said first group of faces.

9. An ultrasonic actuator according to claim 6, wherein said exciter comprises two exciter elements, one provided on each of the two faces of said first group of faces.

10. The ultrasonic actuator of claim 6, wherein said exciter comprises first and second exciter elements, said first exciter element provided on one of said first group of faces and said second exciter element provided on one of said second group of faces.

11. The ultrasonic actuator of claim 6, wherein said exciter element comprises plural exciter elements.

12. An ultrasonic actuator, comprising:
a vibration body which is rod shaped and which has a first group of faces which consists of two opposing faces and a second group of faces which consists of two opposing faces which differ from said first group of faces, both said first group of faces and said second group of faces being extended along a longitudinal direction of said vibration body;
an exciter which is provided on at least one face of said first group of faces of said vibration body, and generates traveling waves which progress in said longitudinal direction of said vibration body; and
a movable member in contact with said vibration body and which is moved by said traveling waves;
a first reflecting portion formed at a first end of said vibration body which reflects said traveling waves progressing in said longitudinal direction from said first group of faces and transmits said traveling waves to said second group of faces;
and, a second reflecting portion formed at a second end of said vibration body which reflects said traveling waves progressing in said longitudinal direction from said second group of faces to said first group of faces;
wherein said first reflecting portion comprises two triangular faces and said second reflecting portion comprises two triangular faces; and
wherein said first group of faces comprise an A face and a C face, said second group of faces comprise a B face and a D face, said first reflecting portion comprises an E face and an F face, and said second reflecting portion comprises a G face and an H face;
two sides of said E face are edges between said E face and said A face and said E face and said B face respectively, two sides of said F face are edges between said F face and said C face and said F face and said D face respectively, and a remaining side of said E face and a remaining side of said F face coincide; and
wherein two sides of said H face are edges between said H face and said A face and said H face and said D face respectively, two sides of said G face are edges between said G face and said B face and said G face and said C face respectively, and a remaining side of said G face and a remaining side of said H face coincide.

* * * * *